US011011107B2

(12) United States Patent
Liu

(10) Patent No.: US 11,011,107 B2
(45) Date of Patent: May 18, 2021

(54) PIXEL CIRCUIT, METHOD FOR DRIVING PIXEL CIRCUIT, AND DISPLAY APPARATUS

(71) Applicant: Huawei Technologies Co., Ltd., Shenzhen (CN)

(72) Inventor: Chun Yen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/462,696

(22) PCT Filed: Apr. 10, 2017

(86) PCT No.: PCT/CN2017/079967

§ 371 (c)(1),
(2) Date: May 21, 2019

(87) PCT Pub. No.: WO2018/094954

PCT Pub. Date: May 31, 2018

(65) Prior Publication Data

US 2019/0362670 A1 Nov. 28, 2019

(30) Foreign Application Priority Data

Nov. 22, 2016 (CN) ........................ 201611056258.9

(51) Int. Cl.
*G06F 1/00* (2006.01)
*G09G 3/3225* (2016.01)

(52) U.S. Cl.
CPC ... *G09G 3/3225* (2013.01); *G09G 2310/0264* (2013.01); *G09G 2310/062* (2013.01)

(58) Field of Classification Search
CPC .......... G09G 3/20; G09G 3/3225; G09G 3/32; G09G 3/30
See application file for complete search history.

(56) References Cited

U.S. PATENT DOCUMENTS 8,643,576 B2 2/2014 Ishiguro et al.
9,454,929 B2 * 9/2016 Uchino ................ G02B 6/4268

(Continued)

FOREIGN PATENT DOCUMENTS

CN 101083049 A 12/2007
CN 202110796 U 1/2012

(Continued)

OTHER PUBLICATIONS

Machine Translation and Abstract of Chinese Publication No. CN104240634, Dec. 24, 2014, 19 pages.

(Continued)

*Primary Examiner* — Michael A Faragalla
(74) *Attorney, Agent, or Firm* — Conley Rose, P.C.

(57) ABSTRACT

A pixel circuit includes a compensation module, a resetting module, a writing module, a driver module, a light emission enabling module, and a light emitting device. The resetting module is configured to reset the driver module and the light emitting device; the compensation module performs threshold voltage compensation on the driver module; the writing module is configured to write, to the driver module, a data voltage that is output by a data line; the light emission enabling module is configured to provide a voltage of a first supply voltage end to the driver module; the driver module is configured to provide, under action of the voltage output by the first supply voltage end, a drive current to the light emitting device; and the light emitting device is configured to emit light based on the drive current. The pixel circuit is configured to drive to display a subpixel.

20 Claims, 14 Drawing Sheets

(56) References Cited

U.S. PATENT DOCUMENTS

| | | | | |
|---|---|---|---|---|
| 2007/0103419 | A1 | 5/2007 | Uchino et al. | |
| 2007/0273621 | A1 | 11/2007 | Yamashita et al. | |
| 2014/0035798 | A1* | 2/2014 | Kawada | G09G 3/3233 345/77 |
| 2014/0225878 | A1* | 8/2014 | Shih | G09G 3/3233 345/205 |
| 2016/0307497 | A1* | 10/2016 | Nie | G09G 3/3233 |

FOREIGN PATENT DOCUMENTS

| | | | |
|---|---|---|---|
| CN | 103383831 | A | 11/2013 |
| CN | 104240634 | A | 12/2014 |
| JP | 2004093682 | A | 3/2004 |

OTHER PUBLICATIONS

Machine Translation and Abstract of Chinese Publication No. CN202110796, Jan. 11, 2012, 10 pages.

Machine Translation and Abstract of Japanese Publication No. JP2004093682, Mar. 25, 2004, 246 pages.

Foreign Communication From a Counterpart Application, Chinese Application No. 201780008037.0, Chinese Office Action dated Aug. 2, 2019, 9 pages.

Foreign Communication From a Counterpart Application, PCT Application No. PCT/CN2017/079967, English Translation of International Search Report dated Jul. 3, 2017, 2 pages.

Foreign Communication From a Counterpart Application, PCT Application No. PCT/CN2017/079967, English Translation of Written Opinion dated Jul. 3, 2017, 3 pages.

* cited by examiner

PIXEL CIRCUIT, METHOD FOR DRIVING PIXEL CIRCUIT, AND DISPLAY APPARATUS

This application is a U.S. National Stage of International Patent Application No. PCT/CN2017/079967 filed on Apr. 10, 2017, which claims priority to Chinese Patent Application No. 201611056258.9 filed on Nov. 22, 2016. Both of the aforementioned applications are hereby incorporated by reference in their entireties.

TECHNICAL FIELD

This application relates to the field of display technologies, and in particular, to a pixel circuit, a method for driving the pixel circuit, and a display apparatus.

BACKGROUND

As a current-type light emitting device, an organic light emitting diode (Organic Light Emitting Diode, OLED) has characteristics such as self-light emission, a quick response, a wide viewing angle, and manufacturability on a flexible substrate. Therefore, organic light emitting diodes are increasingly applied to the high-performance display field.

Each subpixel of an existing OLED display panel is provided with a pixel circuit including a plurality of transistors and a capacitor. The pixel circuit is configured to drive an organic light emitting diode to emit light. As shown in FIG. 1, the pixel circuit includes two transistors M1 and M2 and one storage capacitor Cst. To increase carrier mobility of the transistor to reduce power consumption, an active layer (Active Layer) of the transistor is usually made of polycrystalline silicon.

However, during manufacturing on a large-area glass substrate, active layers at different locations are affected by a process parameter, process precision, and the like of a manufacturing process such as a laser annealing (Excimer laser annealing, ELA) process, a hydrogenation process (Hydrogenation Process), or a channel doping process (Channel Doping Process). Consequently, there is a difference between threshold voltages Vth of driving transistors, that is, transistors M2, located in different subpixels.

In addition, a drive current that flows through an organic light emitting diode in each subpixel is:

$$Isd=\frac{1}{2}\times\mu\times Cgi\times W/L\times(\mathrm{Vsg}-\mathrm{Vth})^2 \quad \text{Formula (1),}$$

where μ is carrier mobility of the driving transistor, Cgi is capacitance between a gate and a channel of the driving transistor, W/L is a width-length ratio of the driving transistor, and Vth is a threshold voltage of the driving transistor.

It can be learned from the foregoing that, the drive current Isd is related to the threshold voltage Vth of the driving transistor. Therefore, when threshold voltages Vth of driving transistors in pixel circuits are inconsistent, values of drive currents Isd that flow through organic light emitting diodes located in the different subpixels are different. Consequently, the organic light emitting diodes in the subpixels emit light having inconsistent brightness, causing a problem such as uneven brightness (mura) in a displayed image. As shown in FIG. 2, an example in which an image 01 with a same gray scale is displayed is used, and the image has areas with relatively low brightness. Based on this, when an OLED display panel in which the pixel circuit is disposed displays an image with a low and medium gray scale value, a drive current Isd that flows through an organic light emitting diode is in a low and medium current range. In this case, the threshold voltage Vth has greater impact on the drive current Isd, and the drive current Isd has relatively high variability. In this case, inconsistent threshold voltages Vth of driving transistors cause source-drain currents Isd of the plurality of driving transistors shown in FIG. 3, and subthreshold swings (Subthreshold Swing) of the driving transistors in the low and medium current range C are different. Consequently, switch sensitivities of the driving transistors are inconsistent, that is, electrical heterogeneity exists. Therefore, when the OLED display panel displays an image with a low and medium gray scale value, a mura phenomenon caused by inconsistent threshold voltages Vth is more obvious.

To resolve the foregoing problem, the prior art provides a pixel circuit that can compensate for the threshold voltage Vth. As shown in FIG. 4*a*, the pixel circuit includes seven transistors (M1, M2, . . . , and M7) and one storage capacitor Cst. In this case, as shown in FIG. 5, in a first phase ①, a signal end N−1 outputs a low voltage, the transistor M1 and the transistor M7 are turned on, and other transistors are turned off. In this case, a gate voltage of the driving transistor M4 may be reset to a voltage of a voltage end Vint. In a second phase ②, a low voltage is input into a signal end N, the transistor M2 and the transistor M3 are turned on, and other transistors are turned off. In this case, a data voltage that is input into a voltage end Vdata is written to a source of the driving transistor M4. In this case, for the transistor M4, a source voltage Vs4=Vdata, and a gate voltage Vg4=Vdata−|Vth|. In a third phase ③, a low voltage is input into a signal end EM, transistors M6, M5, and M4 are turned on, and other transistors are turned off. In this case, for the transistor M4, a source-gate voltage Vsg4=ELVDD−(Vdata−Vth). It can be learned based on the formula (1) that the drive current I that flows through the organic light emitting diode is equal to $\frac{1}{2}\times\mu\times Cgi\times W/L\times(\mathrm{ELVDD}-\mathrm{Vdata})^2$. The current Isd is unrelated to the threshold voltage Vth of the driving transistor M4. Therefore, a phenomenon of uneven brightness caused by a difference between threshold voltages of driving transistors in subpixels can be eliminated.

Based on this, as requirements of users on definition of displayed images become increasingly high, resolution (Resolution) of OLED display panels also needs to be correspondingly increased. However, because a scanning time (Line Time) for each row of subpixels of the display panel is 1/60 of vertical resolution (Vertical Resolution), the line time is decreased when the resolution is increased. In this case, duration of the second phase ② in FIG. 5, that is, a compensation time (Tcom) of the threshold voltage Vth, is also correspondingly decreased. A correspondence between OLED display panels with different resolution, the line time, and Tcom is shown in Table 1.

TABLE 1

| Resolution | Line Time (μs) | Tcom (μs) |
|---|---|---|
| 1280 × 720 | ~11.8 | ~11.8 |
| 1920 × 1080 | ~7.9 | ~7.9 |
| 2560 × 1440 | ~5.9 | ~5.9 |

Based on this, when Tcom is decreased as the resolution is continuously increased, a charging time of the storage capacitor Cst in the pixel circuit is also shortened. In this case, as shown in FIG. 6, in the second phase ②), a voltage difference ΔV between an actual gate voltage Vg4 of the driving transistor M4 and the ideal gate voltage Vg4=Vdata−|Vth| is larger. Therefore, a compensation effect of the threshold voltage Vth becomes worse, and an effect of reducing uneven display brightness is reduced.

SUMMARY

Embodiments of this application provide a pixel circuit, a method for driving the pixel circuit, and a display apparatus, to avoid impact of resolution on a compensation time in the prior art.

To achieve the foregoing objective, the following technical solutions are used in the embodiments of this application.

According to a first aspect, a pixel circuit is provided. The pixel circuit includes a compensation module, a resetting module, a writing module, a driver module, a light emission enabling module, and a light emitting device. Optionally, the light emitting device may be an organic light emitting diode or a light emitting diode. Based on this, the resetting module is electrically connected to a resetting signal line, an initial voltage end, the driver module, and the light emitting device. The resetting module is configured to output, under control of an output signal of the resetting signal line, a voltage of the initial voltage end to the driver module and the light emitting device, to reset the driver module and the light emitting device. The compensation module is electrically connected to a compensation signal line, a reference voltage end, and the driver module. The compensation module is configured to output, under control of an output signal of the compensation signal line, a voltage of the reference voltage end to the driver module, to perform threshold voltage compensation on the driver module. The writing module is electrically connected to a scanning signal line, a data line, and the driver module; and the writing module is configured to write, to the driver module under control of an output signal of the scanning signal line, a data voltage that is output by the data line. The light emission enabling module is electrically connected to an enabling signal line, a first supply voltage end, and the driver module. The light emission enabling module is configured to provide, under control of an output signal of the enabling signal line, a voltage of the first supply voltage end to the driver module. The driver module is further electrically connected to the light emitting device; and the driver module is configured to provide, under action of the voltage output by the first supply voltage end, a drive current to the light emitting device. The light emitting device is further electrically connected to a second supply voltage end; and the light emitting device is configured to emit light based on the drive current. On one hand, the threshold voltage compensation can be performed on the driver module by using the compensation module, thereby reducing a probability that a phenomenon of uneven brightness is caused due to a difference between threshold voltages of driving transistors in subpixels. On the other hand, the compensation signal line can control on and off of the compensation module, so that the compensation module in an on state performs a threshold voltage compensation process. The scanning signal line can control on and off of the writing module, so that the writing module in an on state writes, to the compensation module, the data voltage provided by the data line. Therefore, the compensation signal line and the writing module are respectively controlled by using different signal lines. In this case, even if an each-row subpixel scanning time is correspondingly decreased as resolution of a display panel is continuously increased, only a pulse width of the output signal of the scanning signal line N is affected, and a pulse width of the output signal of the compensation signal line may be adjusted as required. For example, the pulse width of the output signal of the compensation signal line is increased to increase a threshold voltage compensation time, thereby reducing a difference between an actual compensation value and an ideal compensation value, and improving a threshold voltage compensation effect.

In a first possible implementation of the first aspect, the driver module includes a driving transistor and a storage capacitor. The driving transistor has a gate electrically connected to the compensation module and the writing module, a first electrode electrically connected to the light emission enabling module, and a second electrode electrically connected to the resetting module and the light emitting device. One end of the storage capacitor is electrically connected to the second electrode of the driving transistor, and the other end is electrically connected to the gate of the driving transistor. The driving transistor has a relatively large size, and has a driving capability. The driving transistor can provide, under action of the voltage output by the first supply voltage end, a drive current to the light emitting device, to drive the light emitting device to emit light.

With reference to the first possible implementation of the first aspect, the compensation module includes a first transistor. The first transistor has a gate electrically connected to the compensation signal line, a first electrode electrically connected to the reference voltage end, and a second electrode electrically connected to the gate of the driving transistor. The output signal of the compensation signal line can control on or off of the first transistor, and when the first transistor is on, the voltage of the reference voltage end may be output to the gate of the driving transistor by using the first transistor. Based on this, the other end of the storage capacitor is electrically connected to the gate of the driving transistor. Therefore, the voltage of the reference voltage end can be stored in the storage capacitor, to implement the threshold voltage compensation on the driving transistor.

With reference to a second possible implementation of the first aspect, the resetting module includes a second transistor. The second transistor has a gate electrically connected to the resetting signal line, a first electrode electrically connected to the initial voltage end, and a second electrode electrically connected to one end of the storage capacitor. The output signal of the resetting signal line can control on or off of the second transistor, and when the second transistor is on, the voltage of the initial voltage end may be output to the second electrode by using the second transistor, to reset electric charges remained in the storage capacitor and the light emitting device.

With reference to a third possible implementation of the first aspect, the writing module includes a third transistor. The third transistor has a gate electrically connected to the scanning signal line, a first electrode electrically connected to the data line, and a second electrode electrically connected to the gate of the driving transistor. The signal output by the scanning signal line can control on or off of the third transistor, and when the third transistor is on, the data voltage provided by the data line may be output to the gate of the driving transistor by using the third transistor, to be written to a storage voltage. It can be learned from a formula for the drive current that, the drive current that flows through the light emitting device is related to the foregoing, and brightness of light emitted by the light emitting device is further related to a value of the drive current. Therefore, brightness of light emitted by the light emitting device can be controlled by controlling a value of the data voltage written to the driving transistor, thereby finally controlling a gray scale of a subpixel.

With reference to a fourth possible implementation of the first aspect, the light emission enabling module includes a fourth transistor. The fourth transistor has a gate electrically connected to the enabling signal line, a first electrode electrically connected to the first supply voltage end, and a second electrode electrically connected to the first electrode of the driving transistor. The output signal of the enabling signal line can control on or off of the fourth transistor, and when the fourth transistor is on, the voltage of the first supply voltage end may be output to the first electrode of the driving transistor by using the fourth transistor. When the light emitting device emits light, the fourth transistor, the driving transistor, and the light emitting device form a current path, so that under action of the voltage output by the first supply voltage end ELVDD, the driving transistor can provide a drive current to the light emitting device, and the light emitting device receives the drive current to emit light.

Optionally, the first transistor, the second transistor, the third transistor, and the fourth transistor may be field effect transistors. Alternatively, any one of the foregoing transistors may be a thin film transistor.

In addition, when the transistor is a thin film transistor, the thin film transistor may be an N-type thin film transistor. In this case, a first electrode of the transistor is a drain, and a second electrode is a source. Alternatively, the thin film transistor may be a P-type thin film transistor. In this case, a first electrode of the transistor is a source, and a second electrode is a drain.

According to a second aspect, a display apparatus is provided. The display apparatus includes the pixel circuit according to the first aspect. The pixel circuit has a technical effect that is the same as that in the first aspect, and details are not described herein again.

According to a third aspect, a method for driving the pixel circuit according to the first aspect is provided. Within an image frame, the driving method includes: in a first phase of the image frame, outputting, by a resetting module under control of an output signal of a resetting signal line, a voltage of an initial voltage end to a driver module and a light emitting device, to reset the driver module and the light emitting device; in a second phase of the image frame, outputting, by a compensation module under control of an output signal of a compensation signal line, a voltage of a reference voltage end to the driver module, to perform threshold voltage compensation on the driver module; in a third phase of the image frame, writing, to the driver module, by a writing module under control of an output signal of a scanning signal line, a data voltage that is output by a data line; in a fourth phase of the image frame, providing, by a light emission enabling module under control of an output signal of an enabling signal line, a voltage of a first supply voltage end to the driver module; and providing, by the driver module under action of the voltage output by the first supply voltage end, a drive current to the light emitting device, where the light emitting device is configured to emit light based on the drive current. The method has a technical effect that is the same as that of the pixel circuit in the first aspect, and details are not described herein again.

In a first possible implementation of the third aspect, when the driver module includes a driving transistor and a storage capacitor and the compensation module includes a first transistor, in the second phase of the image frame, the driving method includes: turning on the first transistor under control of the output signal of the compensation signal line, and outputting the voltage of the reference voltage end to the gate of the driving transistor by using the first transistor; and turning on the driving transistor, and storing, by the storage capacitor, a threshold voltage of the driving transistor, to implement threshold voltage compensation on the driving transistor.

In a second possible implementation of the third aspect, a pulse width of the output signal of the compensation signal line is greater than a pulse width of the output signal of the scanning signal line. Based on this, when resolution of a display panel is increased, a pulse width of the output signal of the compensation signal line Co may be increased, to increase duration of the second phase ②, and increase a threshold voltage compensation time. Therefore, the compensation signal line Co is used, so that the threshold voltage compensation time may not be affected by the resolution.

REFERENCE NUMERALS

01: Gray-scale image; 10: Driver module; 20: Compensation module; 30: Resetting module; 40: Writing module; 50: Light emission enabling module; N: Scanning signal line; Co: Compensation signal line; EM: Enabling signal line; RE: Resetting signal line; Vref: Reference voltage end; Vint: Initial voltage end; ELVDD: First supply voltage end; ELVSS: Second supply voltage end; Data: Data line; and L: Organic light emitting diode.

DESCRIPTION OF EMBODIMENTS

Figure 7:
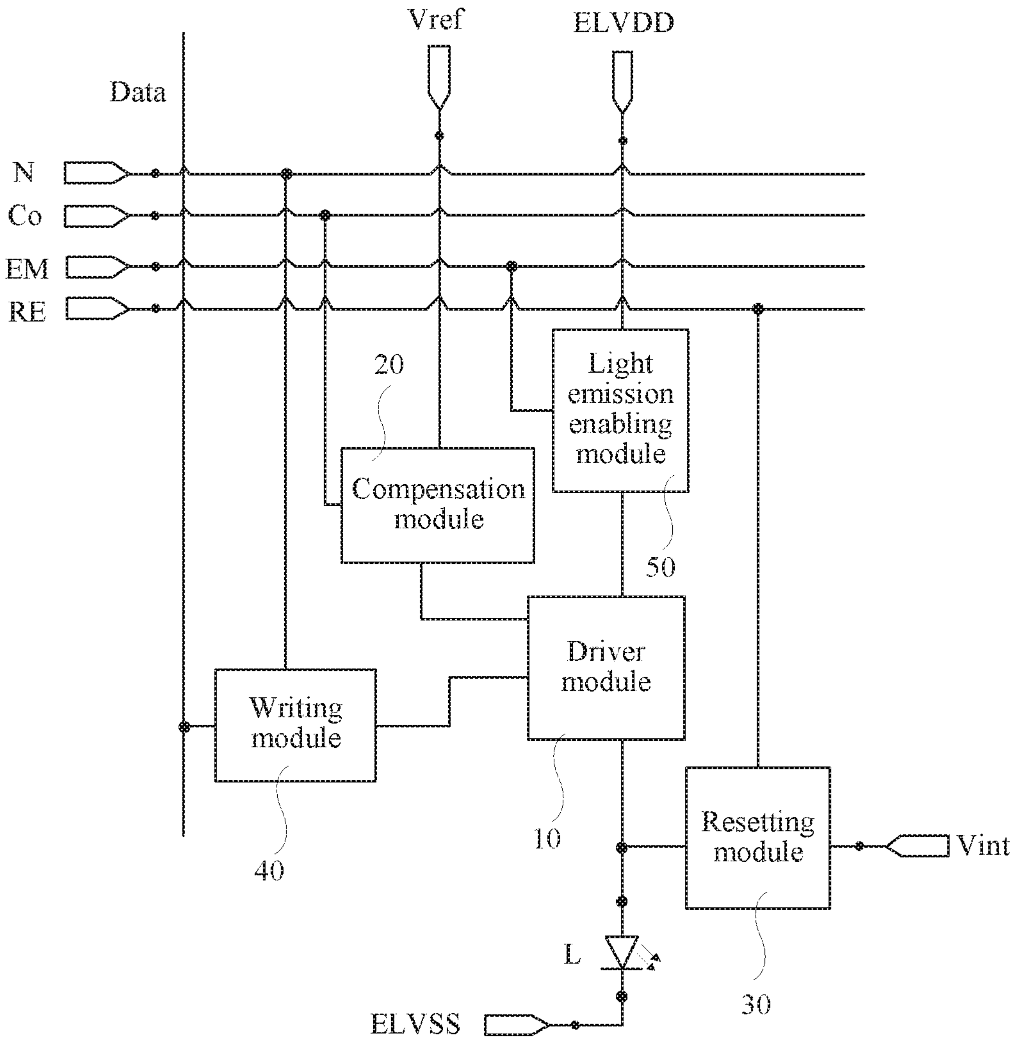
FIG. 7 is a schematic structural diagram of a pixel circuit according to an embodiment of this application.

According to an aspect of this application, a pixel circuit is provided. As shown in FIG. 7, the pixel circuit includes a driver module 10, a compensation module 20, a resetting module 30, a writing module 40, a light emission enabling module 50, and a light emitting device.

Optionally, the light emitting device may be an organic light emitting diode or a light emitting diode (Light Emitting Diode, LED). This is not limited in this application. For ease of description, an example in which the light emitting device is an organic light emitting diode is used below for description. In addition, a connection manner of the light emitting diode and a process of driving the light emitting diode to emit light is the same as those of the organic light emitting diode, and details are not described again.

Based on this, the resetting module 30 is electrically connected to a resetting signal line RE, an initial voltage end Vint, a driver module 10, and an anode of the organic light emitting diode L. The resetting module 30 is configured to output, under control of an output signal of the resetting signal line RE, a voltage of the initial voltage end Vint to the driver module 10 and the anode of the organic light emitting diode L, to reset the driver module 10 and the anode of the organic light emitting diode L. In this way, electric charges of a previous image frame that are remained in the driver module 10 and the organic light emitting diode L can be prevented from affecting display of this image frame.

In addition, the compensation module 20 is electrically connected to a compensation signal line Co, a reference voltage end Vref, and the driver module 10. The compensation module 20 is configured to output, under control of an output signal of the compensation signal line Co, a voltage of the reference voltage end Vref to the driver module 10, to perform threshold voltage compensation on the driver module 10.

The writing module 40 is electrically connected to a scanning signal line N, a data line Data, and the driver module 10. The writing module 40 is configured to write, to the driver module 10 under control of an output signal of the scanning signal line N, a data voltage Vdata that is output by the data line Data.

The light emission enabling module 50 is electrically connected to an enabling signal line EM, a first supply voltage end ELVDD, and the driver module 10. The light emission enabling module 50 is configured to provide, under control of an output signal of the enabling signal line EM, a voltage of the first supply voltage end ELVDD to the driver module 10.

The driver module 10 is further electrically connected to the anode of the organic light emitting diode L, and the driver module 10 is configured to provide, under action of the voltage output by the first supply voltage end ELVDD, a drive current to the organic light emitting diode L.

A cathode of the organic light emitting diode L is further electrically connected to a second supply voltage end ELVSS, and the organic light emitting diode L is configured to emit light based on the drive current.

It can be learned from the foregoing that, on one hand, the threshold voltage compensation can be performed on the driver module 10 by using the compensation module 20, thereby reducing a probability that a phenomenon of uneven brightness is caused due to a difference between threshold voltages of driving transistors in subpixels. On the other hand, the compensation signal line Co can control on and off of the compensation module 20, so that the compensation module 20 in an on state performs a threshold voltage compensation process. The scanning signal line N can control on and off of the writing module 40, so that the writing module 40 in an on state writes, to the compensation module 20, the data voltage Vdata provided by the data line Data. Therefore, the compensation signal line Co and the writing module 40 are respectively controlled by using different signal lines. In this case, even if a scanning time for each row of subpixels is correspondingly decreased as resolution of a display panel is continuously increased, only a pulse width of the output signal of the scanning signal line N is affected, and a pulse width of the output signal of the compensation signal line Co may be adjusted as required. For example, the pulse width of the output signal of the compensation signal line Co is increased to increase a threshold voltage compensation time, thereby reducing a difference between an actual compensation value and an ideal compensation value, and improving a threshold voltage compensation effect.

Specific structures of modules in FIG. 7 are described below in detail.

Figure 8:
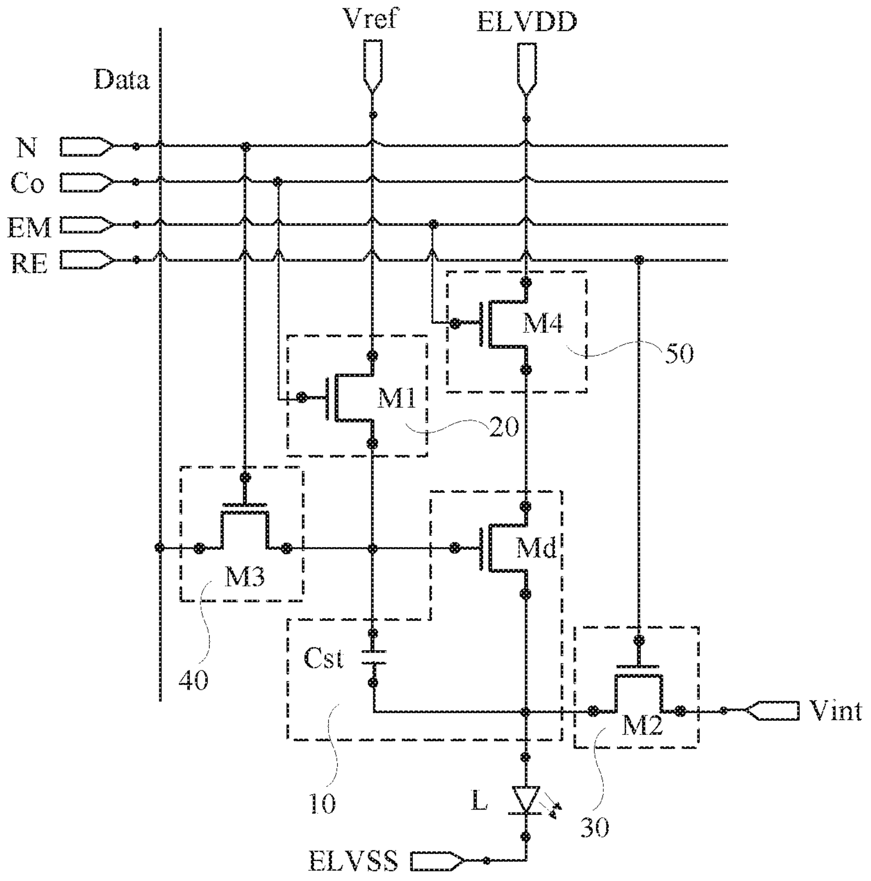
FIG. 8 is a specific schematic structural diagram of modules in FIG. 7.

Specifically, as shown in FIG. 8, the driver module 10 includes a driving transistor Md and a storage capacitor Cst.

The driving transistor Md has a gate electrically connected to the compensation module 20 and the writing module 40, a first electrode electrically connected to the light emission enabling module 50, and a second electrode electrically connected to the resetting module 30 and the anode of the organic light emitting diode L.

One end of the storage capacitor Cst is electrically connected to the second electrode of the driving transistor Md, and the other end is electrically connected to the gate of the driving transistor Md.

It should be noted that, the driving transistor Md has a relatively large size, and has a driving capability. Therefore, the driving transistor Md can provide, under action of the voltage output by the first supply voltage end ELVDD, a drive current to the organic light emitting diode L, to drive the organic light emitting diode L to emit light.

In addition, the compensation module 20 includes a first transistor M1. The first transistor M1 has a gate electrically connected to the compensation signal line Co, a first electrode electrically connected to the reference voltage end Vref, and a second electrode electrically connected to the gate of the driving transistor Md.

In this case, an output signal of the compensation signal line Co can control on or off of the first transistor M1, and when the first transistor M1 is on, the voltage of the reference voltage end Vref may be output to the gate of the driving transistor Md by using the first transistor M1. Based on this, the other end of the storage capacitor Cst is electrically connected to the gate of the driving transistor Md. Therefore, the voltage of the reference voltage end Vref can be stored in the storage capacitor Cst, to implement the threshold voltage compensation on the driving transistor.

In addition, the resetting module 30 includes a second transistor M2. The second transistor M2 has a gate electrically connected to the resetting signal line RE, a first electrode electrically connected to the initial voltage end Vint, and a second electrode electrically connected to one end of the storage capacitor Cst.

In this case, the output signal of the resetting signal line RE can control on or off of the second transistor M2, and when the second transistor M2 is on, the voltage of the initial voltage end Vint may be output to the second electrode of the driving transistor Md by using the second transistor M2, to reset electric charges remained in the storage capacitor Cst and the anode of the organic light emitting diode L.

The writing module 40 includes a third transistor M3. The third transistor M3 has a gate electrically connected to the scanning signal line N, a first electrode electrically connected to the data line Data, and a second electrode electrically connected to the gate of the driving transistor Md.

In this case, the output signal of the scanning signal line N can control on or off of the third transistor M3, and when the third transistor M3 is on, the data voltage Vdata provided by the data line Data may be output to the gate of the driving transistor Md by using the third transistor M3, to be written to a storage voltage Cst. It can be learned from the formula (1) that, the drive current that flows through the organic light emitting diode L is related to Vdata, and brightness of light emitted by the organic light emitting diode L is further related to a value of the drive current. Therefore, brightness of light emitted by the organic light emitting diode L can be controlled by controlling a value of the data voltage Vdata written to the driving transistor Md, thereby finally controlling a gray scale of the subpixel.

In addition, the light emission enabling module 50 includes a fourth transistor M4. The fourth transistor M4 has a gate electrically connected to the enabling signal line EM, a first electrode electrically connected to the first supply voltage end ELVDD, and a second electrode electrically connected to the first electrode of the driving transistor Md.

In this case, the output signal of the enabling signal line EM can control on or off of the fourth transistor M4, and when the fourth transistor M4 is on, the voltage of the first supply voltage end ELVDD may be output to the first electrode of the driving transistor Md by using the fourth transistor M4. When the organic light emitting diode L emits light, the fourth transistor M4, the driving transistor Md, and the organic light emitting diode L form a current path, so that the driving transistor Md can provide, under action of the voltage output by the first supply voltage end ELVDD, a drive current to the organic light emitting diode L, and the organic light emitting diode L receives the drive current to emit light.

It should be noted that, in this application, the first supply voltage end ELVDD outputs a constant high voltage, and the second supply voltage end ELVSS outputs a constant low voltage.

In addition, in this application, the driving transistor Md, the first transistor M1, the second transistor M2, the third transistor M3, and the fourth transistor M4 may be field effect transistors (Field Effect Transistor, FET). Alternatively, any one of the foregoing transistors may be a thin film transistor (Thin Film Transistor, TFT).

In addition, when the transistor is a thin film transistor, the thin film transistor may be an N-type thin film transistor. In this case, a first electrode of the transistor is a drain, and a second electrode is a source. Alternatively, the thin film transistor may be a P-type thin film transistor. In this case, a first electrode of the transistor is a source, and a second electrode is a drain.

A method for driving the pixel circuit shown in FIG. 8 is described below in detail by using an example in which any one of the foregoing transistors is an N-type thin film transistor and with reference to time sequence diagrams shown in FIG. 9*a* to FIG. 9*d*.

Figure 9A:
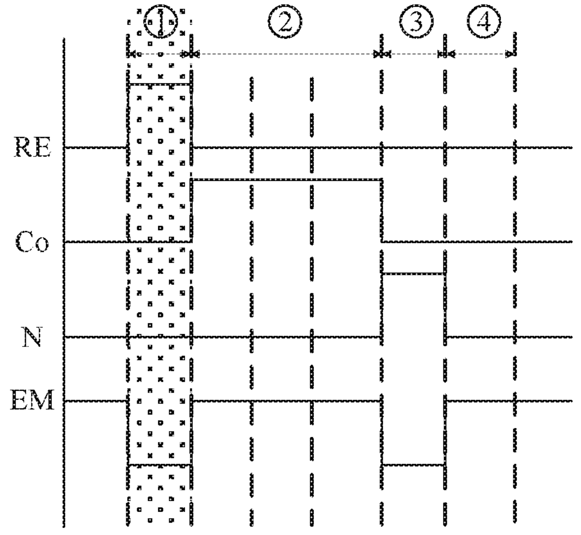
FIG. 9*a* is a first schematic manner of a time sequence diagram of a plurality of control signals used to drive the pixel circuit shown in FIG. 8.

As shown in FIG. 9*a*, in a first phase ① of an image frame, the resetting signal line RE outputs a high voltage, and other signal lines output low voltages.

Figure 10A:
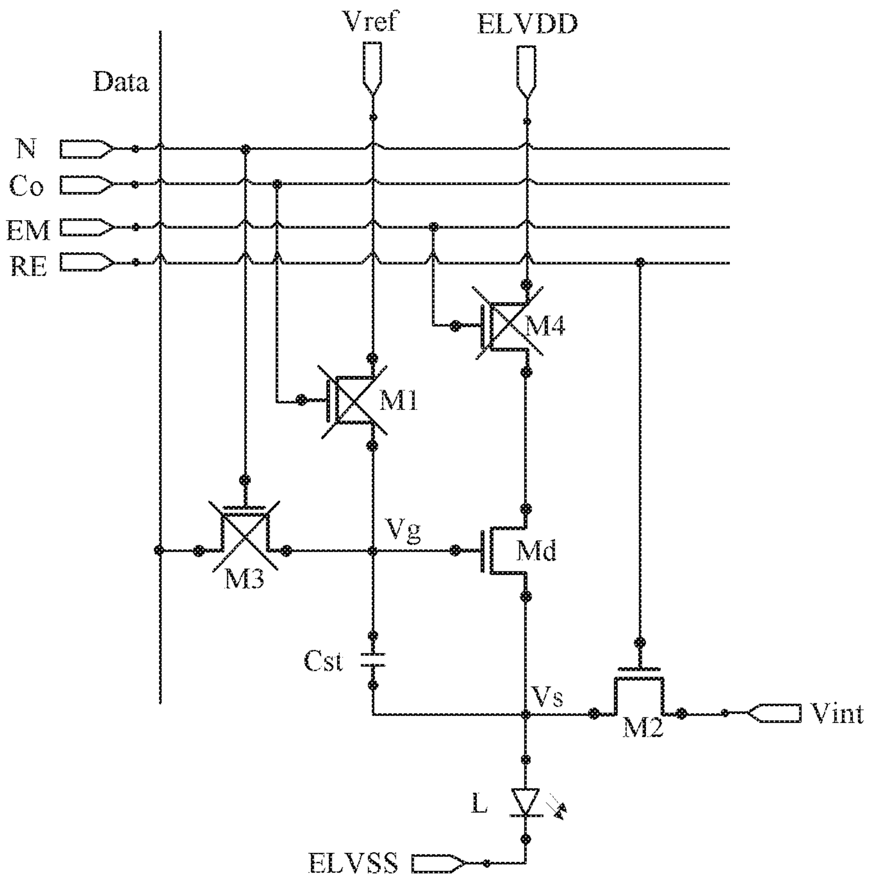
FIG. 10*a* is a schematic diagram of on and off of each transistor in the pixel circuit shown in FIG. 8 in a first phase shown in FIG. 9*a;*

In this case, an on or off state of each transistor in the pixel circuit is shown in FIG. 10*a*. The second transistor M2 is on. In addition, a value of the voltage output by the initial voltage end Vint may be controlled to enable the driving transistor Md to satisfy a turn-on condition in the phase, so that the driving transistor Md is in the on state. Other transistors are in the off state.

Based on this, the voltage of the initial voltage end Vint is output to a source of the second transistor M2 by using the second transistor M2, to reset the electric charges remained in the storage capacitor Cst and the anode of the organic light emitting diode L. In this case, a source voltage Vs of the driving transistor Md=Vint.

Figure 9B:
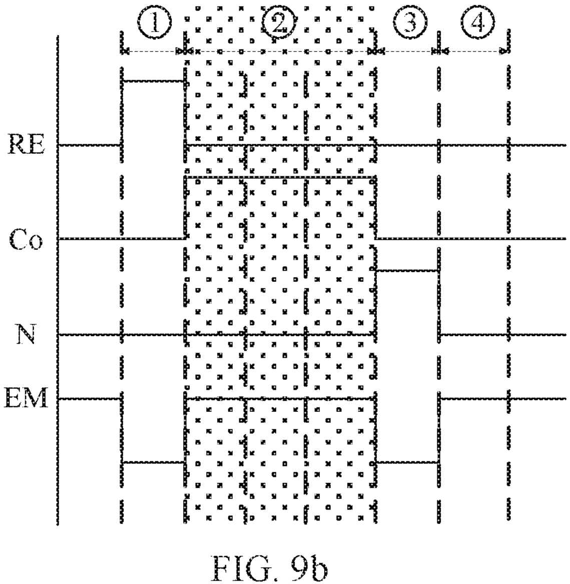
FIG. 9*b* is a second schematic manner of a time sequence diagram of a plurality of control signals used to drive the pixel circuit shown in FIG. 8.

In conclusion, as shown in FIG. 9*b*, the first phase ① is a resetting phase of the pixel circuit.

Next, in a second phase ② of the image frame, the compensation signal line Co and the enabling signal line EM output high voltages, and other signal lines output low voltages.

Figure 10B:
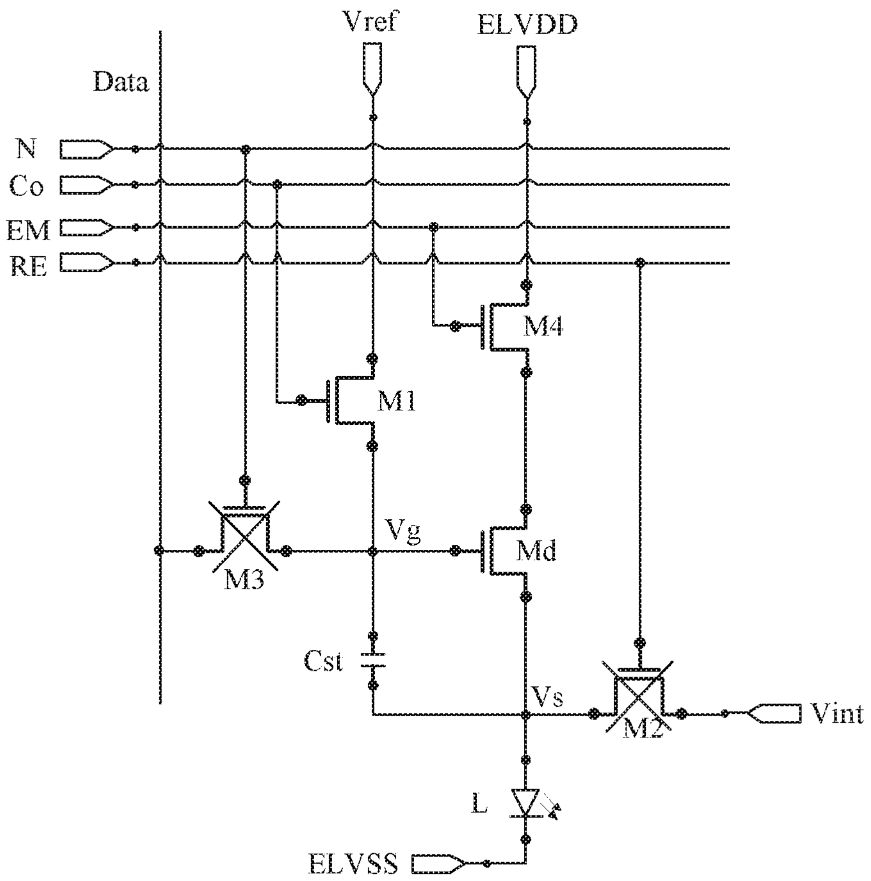
FIG. 10*b* is a schematic diagram of on and off of each transistor in the pixel circuit shown in FIG. 8 in a second phase shown in FIG. 9*b;*

In this case, the on or off state of each transistor in the pixel circuit is shown in FIG. 10*b*. Under control of the output signal of the compensation signal line Co, the first transistor M1 is turned on. Under control of the enabling signal line EM, the fourth transistor M4 is turned on. The driving transistor Md remains in the on state, and the other transistors are in the off state.

Based on this, the voltage of the reference voltage end Vref is output to the gate of the driving transistor Md by using the first transistor M1, so that for the driving transistor Md, a gate voltage Vg=Vref. As shown in FIG. 9*e*, the gate voltage Vg and the source voltage Vs of the driving transistor Md satisfy Vg−Vs=Vth. FIG. 9*e* is described by using an example in which Vth is equal to 1 V. Therefore, in this case, for the driving transistor Md, the source voltage Vs=Vg−Vth=Vref−Vth. In this case, a voltage difference between two ends of the storage capacitor Cst is Vth. Therefore, the threshold voltage Vth of the driving transistor Md is stored in the storage capacitor Cst.

It should be noted that, in this phase, the pulse width of the output signal of the compensation signal line Co may be adjusted as required, to ensure that the storage capacitor Cst has a sufficient charging time, so that a threshold voltage compensation time may be increased, thereby reducing a difference between an actual compensation value and an ideal compensation value, and improving a threshold voltage compensation effect. For example, as shown in FIG. 9*b*, the pulse width of the output signal of the compensation signal line Co is approximately triple the pulse width of the output signal of the scanning signal line N. In this way, even if resolution of an OLED display panel is increased, and a scanning time for each row of subpixels is correspondingly decreased, only the pulse width of the output signal of the scanning signal line N is affected, and the pulse width of the output signal of the compensation signal line Co may be adjusted as required.

Certainly, the foregoing descriptions are provided by using an example in which the pulse width of the output signal of the compensation signal line Co is approximately triple the pulse width of the output signal of the scanning signal line N. Persons skilled in the art may set the pulse width of the output signal of the compensation signal line Co to twice, quadruple, or the like the pulse width of the output signal of the scanning signal line N by comprehensively considering compensation precision and costs. This is not limited in this application.

In conclusion, the second phase ② is a threshold voltage compensation phase of the pixel circuit.

Figure 9C:
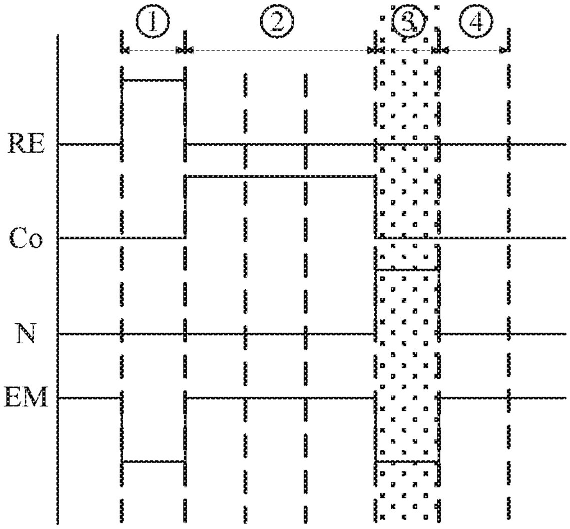
FIG. 9*c* is a third schematic manner of a time sequence diagram of a plurality of control signals used to drive the pixel circuit shown in FIG. 8.

Next, as shown in FIG. 9*c*, in a third phase ③ of the image frame, the scanning signal line N outputs a high voltage, and other signal lines output low voltages.

Figure 10C:
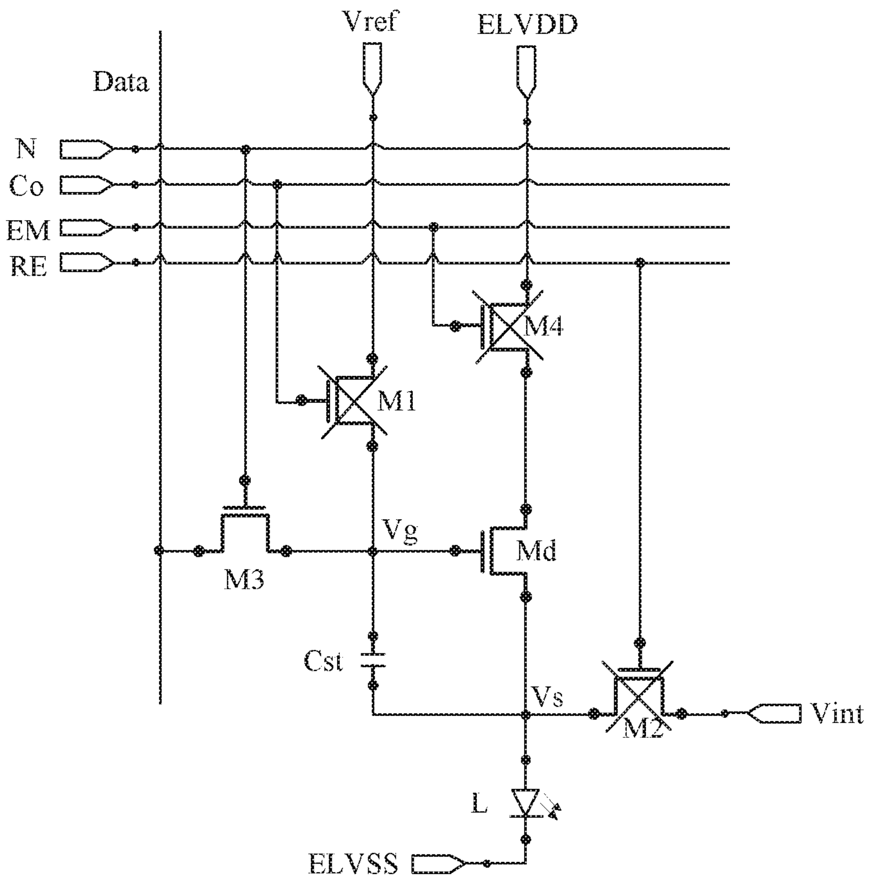
FIG. 10*c* is a schematic diagram of on and off of each transistor in the pixel circuit shown in FIG. 8 in a third phase shown in FIG. 9*c;*

In this case, the on or off state of each transistor in the pixel circuit is shown in FIG. 10*c*. Under control of the scanning signal line N, the third transistor M3 is turned on. The data voltage Vdata provided by the data line Data is output to the gate of the driving transistor Md by using the third transistor M3, and is written to the storage voltage Cst. In this case, for the driving transistor Md, the gate voltage Vg=Vdata. Because the storage capacitor Cst has a bootstrap function, for the driving transistor Md, the source voltage $Vs=Vref-Vth+\alpha(Vdata-Vref)$.

$\alpha=Cst/(Cst+Coled)$, and Coled is equivalent capacitance of the organic light emitting diode L.

In conclusion, the third phase ③ is a data voltage Vdata writing phase of the pixel circuit, and the written data voltage Vdata matches a gray scale value displayed in the subpixel.

Figure 9D:
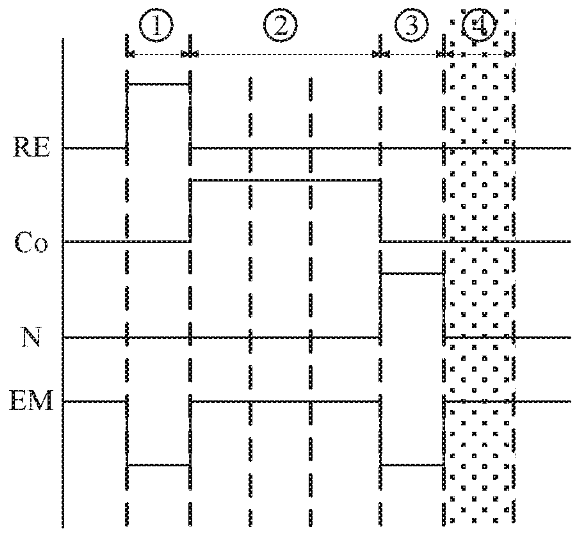
FIG. 9*d* is a fourth schematic manner of a time sequence diagram of a plurality of control signals used to drive a pixel circuit shown in FIG. 8.
Figure 9E:
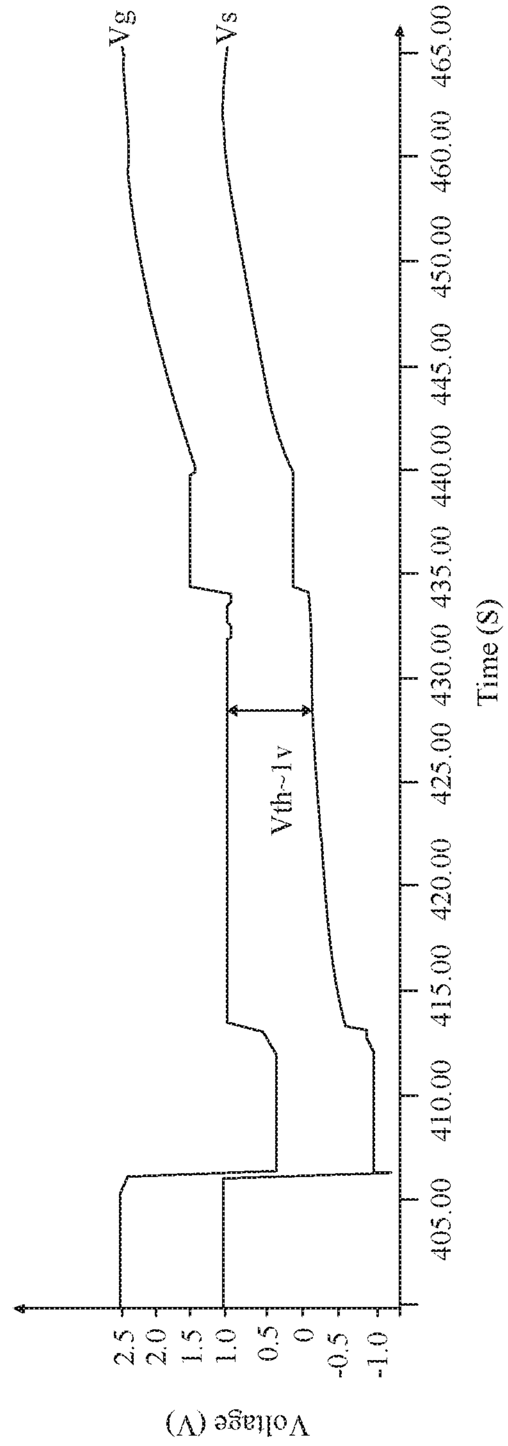
FIG. 9*e* is a curve diagram showing a gate voltage and a source voltage that drive a driving transistor in the pixel circuit shown in FIG. 8 varying with time.

Next, as shown in FIG. 9*d*, in a fourth phase ③ of the image frame, the enabling signal line EM outputs a high voltage, and other signal lines output low voltages.

Figure 10D:
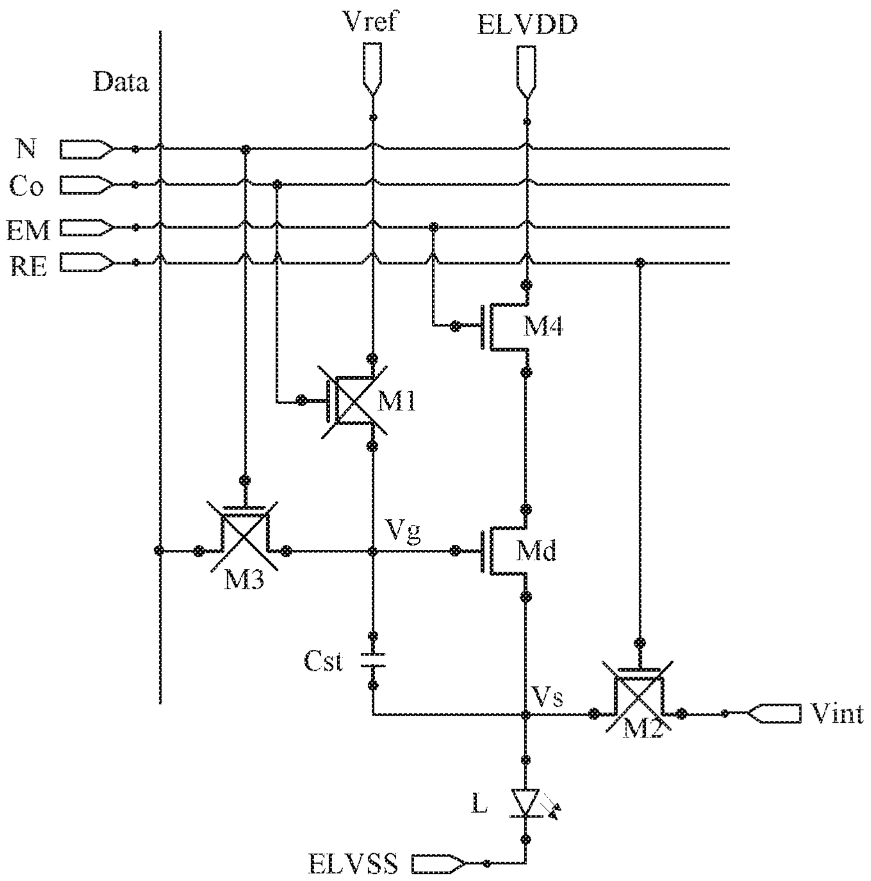
FIG. 10*d* is a schematic diagram of on and off of each transistor in the pixel circuit shown in FIG. 8 in a fourth phase shown in FIG. 9*d;*

In this case, the on or off state of each transistor in the pixel circuit is shown in FIG. 10*d*. Under control of the output signal of the enabling signal line EM, the fourth transistor M4 is turned on. In addition, the driving transistor Md remains in the on state, and the other transistors are in the off state. In this case, the fourth transistor M4, the driving transistor Md, and the organic light emitting diode L form a current path. A gate-source voltage of the driving transistor Md is:

$$\begin{aligned} Vgs &= Vg - Vs \\ &= Vdata - (Vref - Vth + \alpha(Vdata - Vref)) \\ &= Vdata(1-\alpha) - Vref(1+\alpha) + Vth \end{aligned} \quad . \qquad \text{Formula (2)}$$

Based on this, it can be obtained based on the formula (1) that a drive current I provided by the driving transistor Md to the organic light emitting diode L is:

$$\begin{aligned} I = Ids &= \beta(Vgs - Vth)^2 \\ &= \beta(Vdata(1-\alpha) - Vref(1+\alpha) + Vth - Vth)^2 \\ &= \beta(Vdata(1-\alpha) - Vref(1+\alpha))^2 \end{aligned} ,$$

$$\text{where } \beta = 1/2 \times \mu \times W/L$$

In conclusion, the fourth phase ④ is a light emission phase of the pixel circuit.

It can be learned from this that, the drive current I that drives the organic light emitting diode L to emit light is unrelated to the threshold voltage Vth of the driving transistor Md, thereby reducing a probability that a phenomenon of uneven brightness is caused due to a difference between threshold voltages of driving transistors in subpixels. Based on this, duration of the second phase ② can be increased by increasing the pulse width of the output signal of the compensation signal line Co, thereby increasing the threshold voltage compensation time.

To verify a compensation effect of the pixel circuit shown in FIG. 8 in this application, pixel circuits in different subpixels may be selected on the OLED display panel. When driving transistors Md in the pixel circuits have different threshold voltages Vth, a compensation effect of the pixel circuit is learned of by using a variation relationship between a drive current I that flows through an organic light emitting diode L in each pixel circuit and a data voltage Vdata written to each driving transistor Md.

Figure 11:
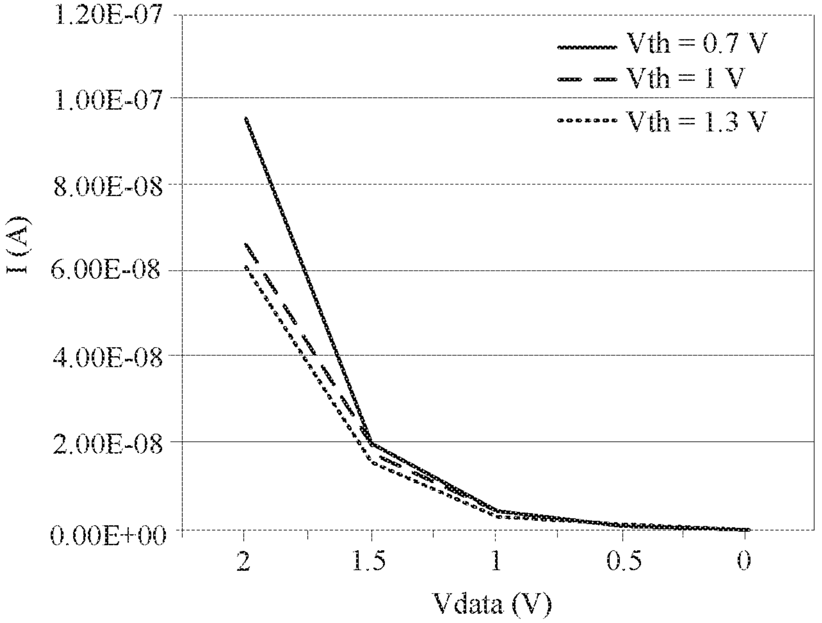
FIG. 11 is a curve diagram of a relationship between a data voltage written to a driving transistor and a drive current that flows through a light emitting diode, when the pixel circuit shown in FIG. 8 is used.

Specifically, for example, three subpixels are selected, threshold voltages Vth of driving transistors Md in pixel circuits in the three subpixels are respectively 0.7 V, 1 V, and 1.3 V. In this case, the variation relationship between the drive current I that flows through the organic light emitting diode L in each pixel circuit and the data voltage Vdata written to each driving transistor Md is shown in FIG. 11, and convergence properties of the three curves are relatively good. In particular, when the data voltage Vdata is relatively small, that is, when an OLED display panel provided with the pixel circuit provided in this application displays an image with a low and medium gray scale value, a coincidence degree of the three curves is relatively high, so that when the OLED display panel displays the image with the low and medium gray scale value, impact of inconsistency between threshold voltages of the driving transistors on the drive current I that flows through the organic light emitting diode L is effectively avoided.

Figure 1:
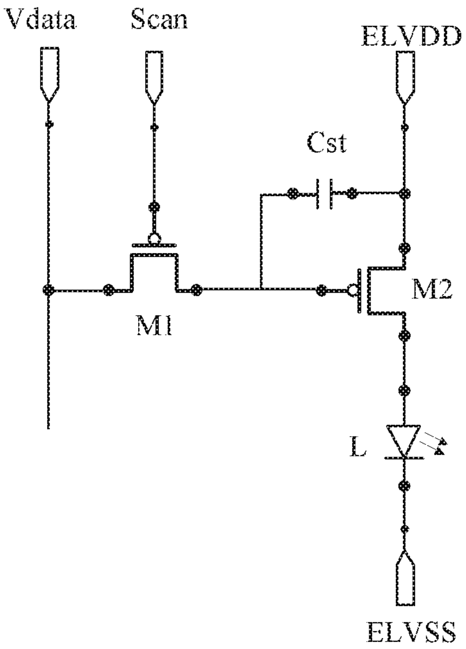
FIG. 1 is a schematic structural diagram of a pixel circuit in the prior art.
Figure 2:
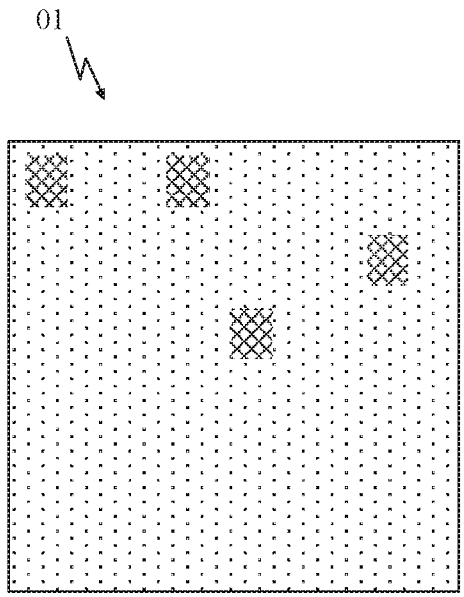
FIG. 2 is a schematic diagram of a gray-scale image having a phenomenon of uneven brightness.
Figure 3:
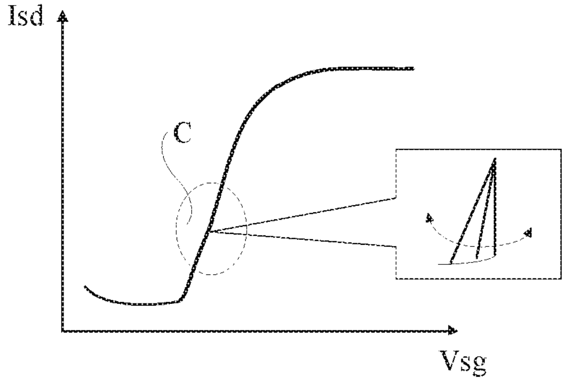
FIG. 3 is an I/V curve diagram of a plurality of transistors disposed in the pixel circuit shown in FIG. 1.
Figure 4A:
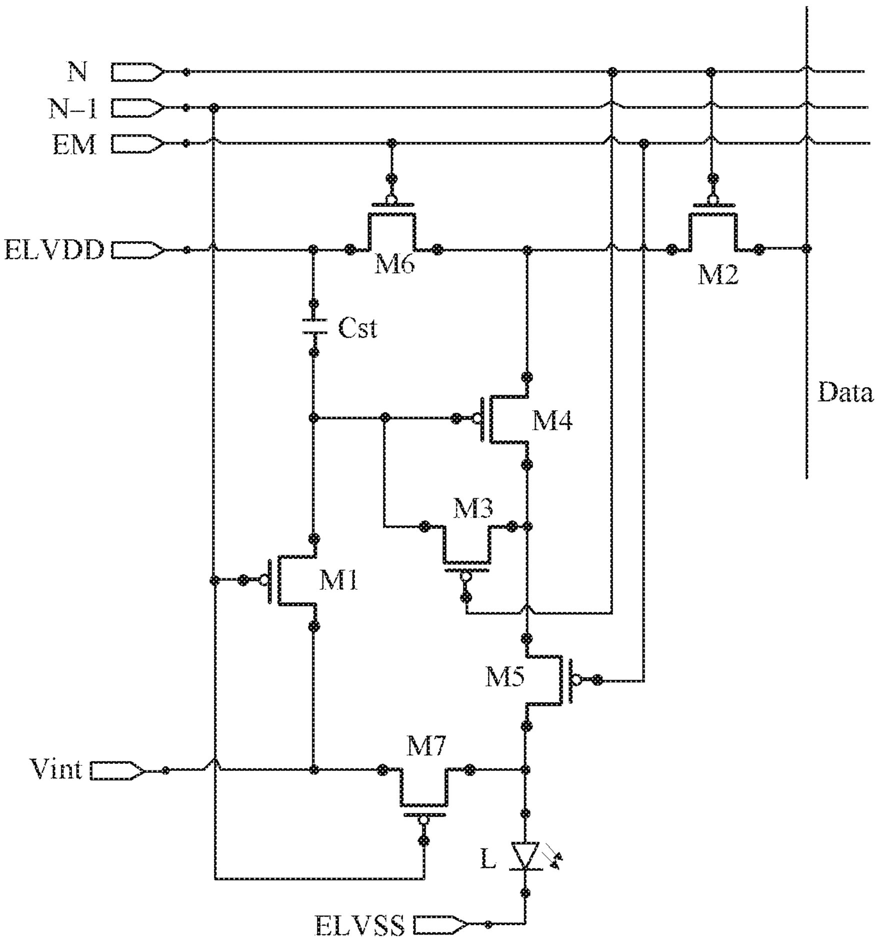
FIG. 4*a* is a schematic structural diagram of a pixel circuit having a threshold voltage compensation function in the prior art.
Figure 4B:
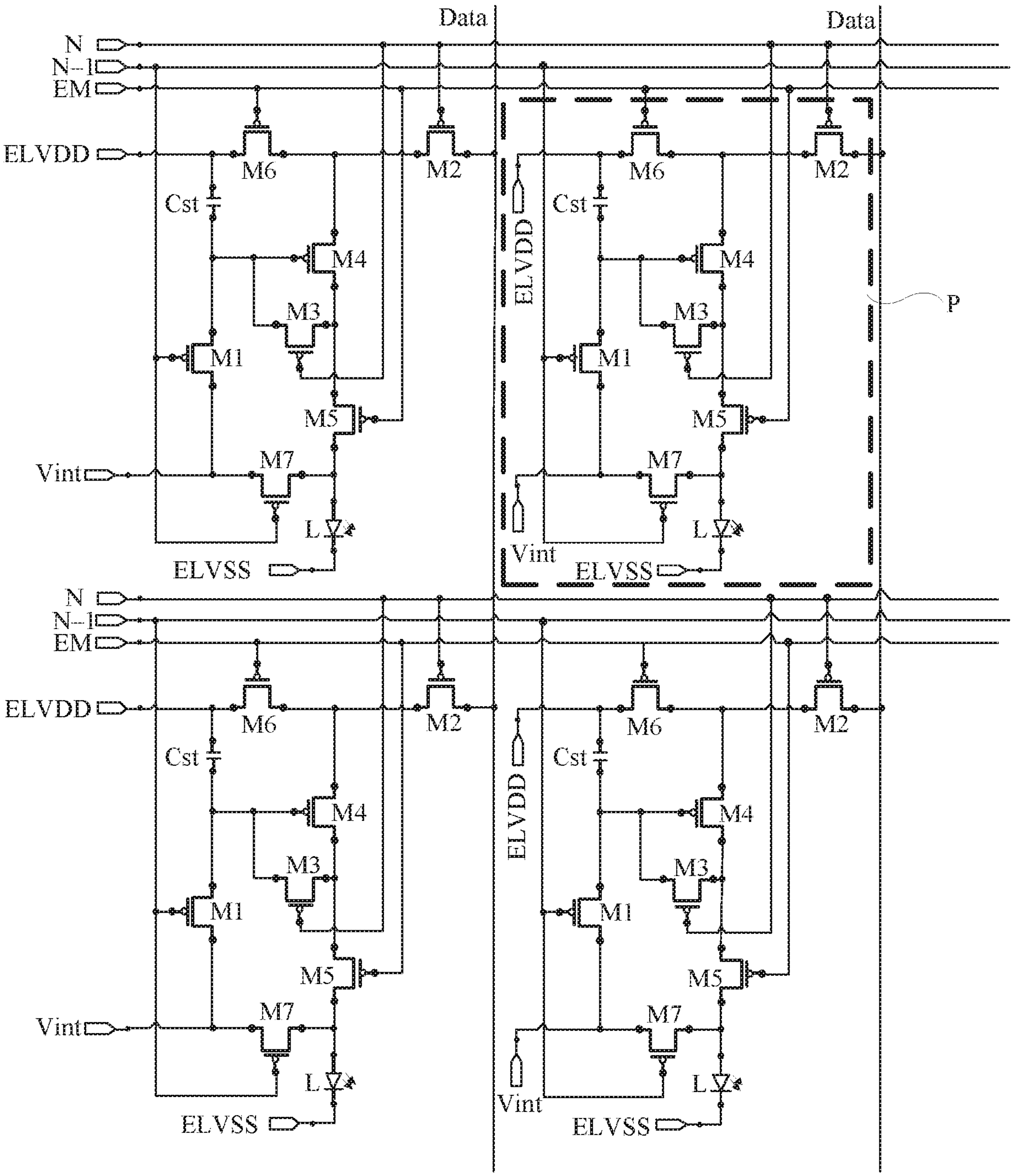
FIG. 4*b* is a schematic diagram of a plurality of subpixels provided with the pixel circuit shown in FIG. 4*a;*
Figure 5:
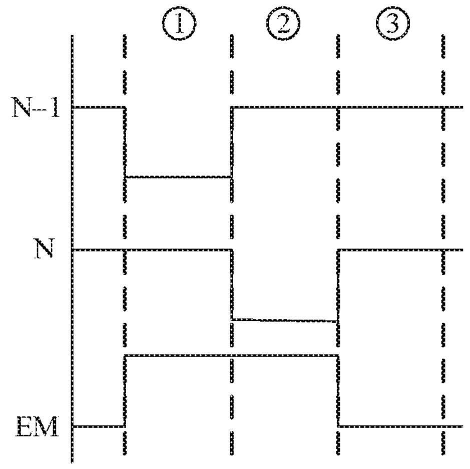
FIG. 5 is a time sequence diagram of a plurality of control signals used to drive the pixel circuit shown in FIG. 4*a;*
Figure 6:
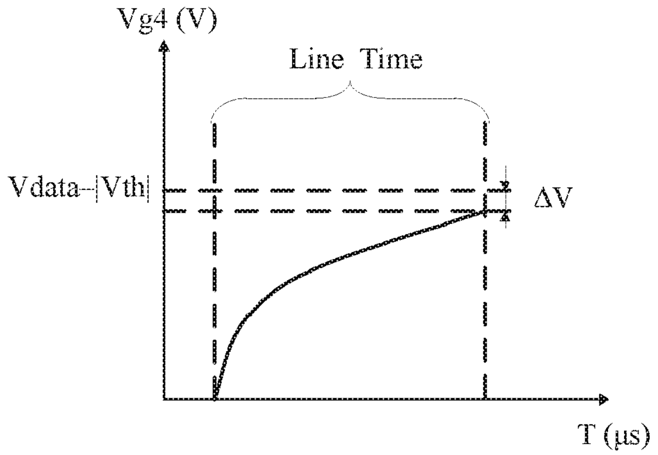
FIG. 6 is a schematic diagram in which there is a difference between an actual compensation value and an ideal compensation value of a threshold voltage when the pixel circuit shown in FIG. 4*a* is used.

In addition, a pixel circuit provided in the prior art that is shown in FIG. 4*a* has seven transistors and one capacitor. Therefore, as shown in FIG. 4*b*, each subpixel P needs to have sufficient wiring space, so that each component and each connection line in the pixel circuit can be placed in the subpixel. However, as resolution of a display panel is continuously increased, and a quantity of subpixels P is gradually increased, an area available for wiring is becoming increasingly small. Therefore, a problem that the circuit provided in the prior art cannot be completely disposed in the subpixel P exists. However, when the pixel circuit shown in FIG. 8 in this application is used, the pixel circuit has only five transistors and one storage capacitor. Therefore, occupied wiring space of a single subpixel is reduced, so that the pixel circuit is applicable to a display panel with relatively high pixel density (Pixels Per Inch, PPI).

According to another aspect of this application, a display apparatus is provided. The display apparatus includes the pixel circuit having any one of the foregoing structures. The pixel circuit has a technical effect the same as that of the pixel circuit provided in the foregoing embodiments, and details are not described herein again.

The display apparatus may be specifically a product or a component, such as an OLED television, an OLED mobile phone, or an OLED tablet computer, having any display function.

Figure 12:
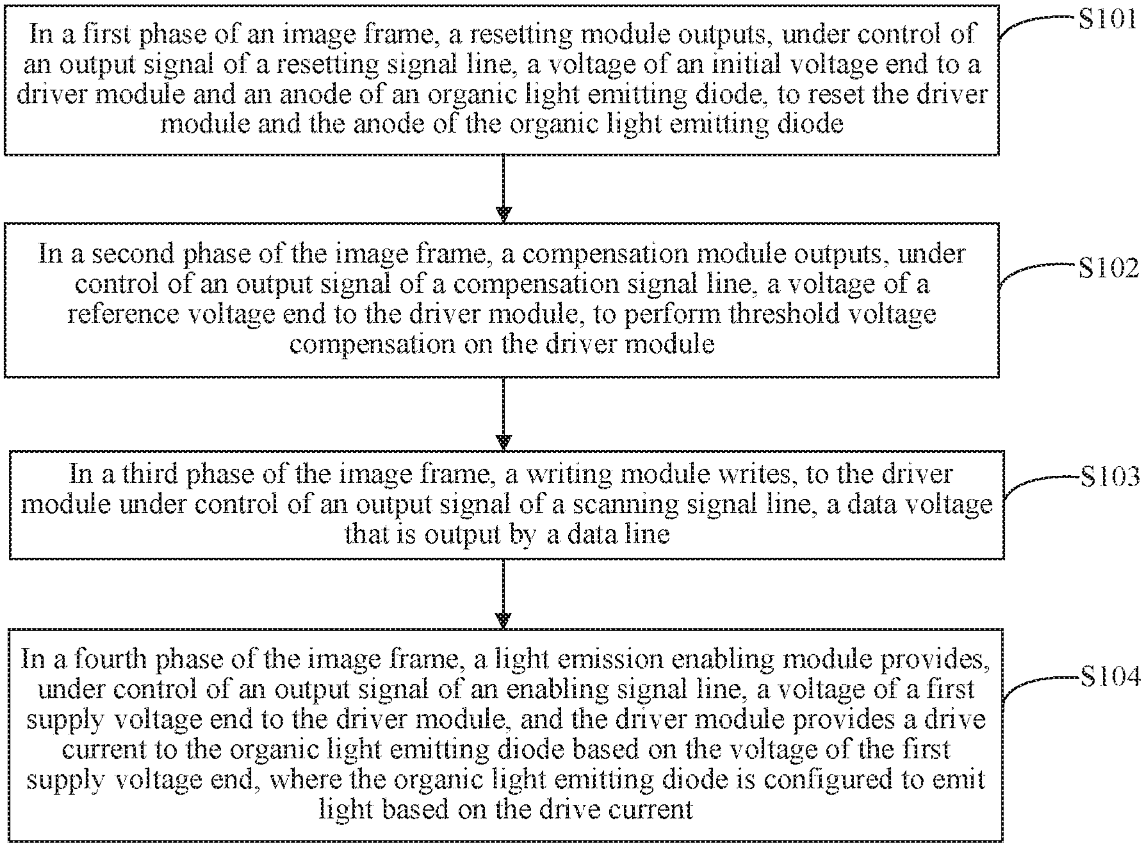
FIG. 12 is a flowchart of a method for driving a pixel circuit according to another embodiment of this application.

According to still another aspect of this application, a method for driving any one of the foregoing pixel circuits is provided. As shown in FIG. 12, within an image frame, the driving method includes the following steps.

S101: As shown in FIG. 9*a*, in a first phase ① of the image frame, a resetting module 30 outputs, under control of an output signal of a resetting signal line RE, a voltage of an initial voltage end Vint to a driver module 10 and an anode of an organic light emitting diode L, to reset the driver module 10 and the anode of the organic light emitting diode L.

As shown in FIG. 8, the resetting module 30 includes a second transistor M2. Specifically, a process of resetting the driver module 10 and the anode of the organic light emitting diode L by using the second transistor M2 is the same as that described above, and details are not described herein again.

S102: As shown in FIG. 9*b*, in a second phase ② of the image frame, a compensation module 20 outputs, under control of an output signal of a compensation signal line Co, a voltage of a reference voltage end Vref to the driver module 10, to perform threshold voltage compensation on the driver module 10.

Specifically, the compensation module 20 is shown in FIG. 8, and may include a first transistor M1. In this case, step S102 includes:

turning on, under control of the output signal of the compensation signal line Co, the first transistor M1, and outputting the voltage of the reference voltage end Vref to a gate of a driving transistor Md by using the first transistor M1.

Next, the driving transistor Md is turned on, and a storage capacitor Cst stores a threshold voltage Vth of the driving transistor Md, to implement compensation on the threshold voltage Vth. Specifically, a process of performing compensation on the threshold voltage Vth of the driving transistor Md by using the compensation module 20 is the same as that described above, and details are not described herein again.

In addition, on and off of the first transistor M1 may be separately controlled by using the compensation signal line Co. Therefore, when resolution of a display panel is increased, a pulse width of the output signal of the compensation signal line Co may be increased, to make the pulse width of the output signal of the compensation signal line Co greater than a pulse width of an output signal of a scanning signal line N, thereby increasing duration of the second phase ②, and increasing a threshold voltage compensation time. Therefore, the compensation signal line Co is used, so that the threshold voltage compensation time may not be affected by the resolution.

S103: As shown in FIG. 9*c*, in a third phase ③ of the image frame, a writing module 40 writes, to the driver module 10 under control of an output signal of a scanning signal line N, a data voltage Vdata that is output by a data line Data. As shown in FIG. 8, the writing module 40 includes a third transistor M3. Specifically, a writing process of implementing writing of the data voltage Vdata by using the third transistor M3 is the same as that described above, and details are not described herein again.

S104: As shown in FIG. 9*d*, in a fourth phase ④ of the image frame, a light emission enabling module 50 provides, under control of an output signal of an enabling signal line EM, a voltage of a first supply voltage end ELVDD to the driver module 10. The driver module 10 provides, under action of the voltage output by the first supply voltage end ELVDD, a drive current to the organic light emitting diode L, and the organic light emitting diode L is configured to emit light based on the drive current.

As shown in FIG. 8, the light emission enabling module 50 includes a fourth transistor M4, and the driver module 10 includes the driving transistor Md. Specifically, when the fourth transistor M4 is turned on, a process of driving, by using the driving transistor Md, the organic light emitting diode L to emit light is the same as that described above, and details are not described herein again.

In addition, a technical effect of the method for driving the pixel circuit is the same as the technical effect of the pixel circuit provided in the foregoing embodiments, and details are not described herein again. The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A pixel circuit, comprising:

a driver circuit comprising a storage capacitor;

a light emitting device coupled to the driver circuit;

a resetting circuit electrically coupled to a resetting signal line, an initial voltage end, the driver circuit, and the light emitting device and configured to output, under control of an output signal of the resetting signal line, a voltage of the initial voltage end to the driver circuit and the light emitting device to reset the driver circuit and the light emitting device;

a compensation circuit electrically coupled to a compensation signal line, a reference voltage end, and the storage capacitor of the driver circuit and configured to output, under control of an output signal of the compensation signal line, a voltage of the reference voltage end to the storage capacitor of the driver circuit to perform threshold voltage compensation on the driver circuit by controlling a charging time of the storage capacitor, wherein the charging time of the storage capacitor is controlled by adjusting a pulse width of the output signal of the compensation signal line based on a pulse width of an output signal of a scanning signal line;

a writing circuit electrically coupled to the scanning signal line, a data line, and the driver circuit and configured to write, to the driver circuit under control of the output signal of the scanning signal line, a data voltage output by the data line; and a light emission enabling circuit electrically coupled to an enabling signal line, a first supply voltage end, and the driver circuit and configured to provide, under control of an output signal of the enabling signal line, a voltage of the first supply voltage end to the driver circuit, wherein the driver circuit is configured to provide, under action of the voltage output by the first supply voltage end, a drive current to the light emitting device, and wherein the light emitting device is further electrically coupled to a second supply voltage end and configured to emit light based on the drive current.

2. The pixel circuit of claim 1, wherein the driver circuit further comprises a driving transistor, wherein a gate of the driving transistor is electrically coupled to the compensation circuit and the writing circuit, wherein a first electrode of the driving transistor is electrically coupled to the light emission enabling circuit, wherein a second electrode of the driving transistor is electrically coupled to the resetting circuit and the light emitting device, wherein a first end of the storage capacitor is electrically coupled to the second electrode of the driving transistor, and wherein a second end of the storage capacitor is electrically coupled to the gate of the driving transistor.

3. The pixel circuit of claim 2, wherein the compensation circuit comprises a first transistor, wherein a gate of the first transistor is electrically coupled to the compensation signal line, wherein a first electrode of the first transistor is electrically coupled to the reference voltage end, and wherein a second electrode of the first transistor is electrically coupled to the gate of the driving transistor.

4. The pixel circuit of claim 2, wherein the resetting circuit comprises a second transistor, wherein a gate of the second transistor is electrically coupled to the resetting signal line, wherein a first electrode of the second transistor is electrically coupled to the initial voltage end, and wherein a second electrode of the second transistor is electrically coupled to the first end of the storage capacitor.

5. The pixel circuit of claim 2, wherein the writing circuit comprises a third transistor, wherein a gate of the third transistor is electrically coupled to the scanning signal line, wherein a first electrode of the third transistor is electrically coupled to the data line, and wherein a second electrode of the third transistor is electrically coupled to the gate of the driving transistor.

6. The pixel circuit of claim 2, wherein the light emission enabling circuit comprises a fourth transistor, wherein a gate of the fourth transistor is electrically coupled to the enabling signal line, wherein a first electrode of the fourth transistor is electrically coupled to the first supply voltage end, and wherein a second electrode of the fourth transistor is electrically coupled to the first electrode of the driving transistor.

7. The pixel circuit of claim 1, wherein the light emitting device is a light emitting diode.

8. A display apparatus, comprising:

a light emitting device; and a driver circuit coupled to the light emitting device and configured to drive the light emitting device to emit light, wherein the driver circuit comprises:

a storage capacitor;

a resetting circuit electrically coupled to a resetting signal line, an initial voltage end, the driver circuit, and the light emitting device and configured to output, under control of an output signal of the resetting signal line, a voltage of the initial voltage end to the driver circuit and the light emitting device to reset the driver circuit and the light emitting device;

a compensation circuit electrically coupled to a compensation signal line, a reference voltage end, and the storage capacitor of the driver circuit and configured to output, under control of an output signal of the compensation signal line, a voltage of the reference voltage end to the storage capacitor of the driver circuit to perform threshold voltage compensation on the driver circuit by controlling a charging time of the storage capacitor, wherein the charging time of the storage capacitor is controlled by adjusting a pulse width of the output signal of the compensation signal line based on a pulse width of an output signal of a scanning signal line;

a writing circuit electrically coupled to the scanning signal line, a data line, and the driver circuit and configured to write, to the driver circuit under control of the output signal of the scanning signal line, a data voltage output by the data line; and a light emission enabling circuit electrically coupled to an enabling signal line, a first supply voltage end, and the driver circuit and configured to provide, under control of an output signal of the enabling signal line, a voltage of the first supply voltage end to the driver circuit, wherein the driver circuit is configured to provide, under action of the voltage output by the first supply voltage end, a drive current to the light emitting device, and wherein the light emitting device is further electrically coupled to a second supply voltage end and configured to emit light based on the drive current.

9. A method for driving a pixel circuit, wherein within an image frame, the method comprises:

outputting, in a first phase of the image frame using a resetting circuit under control of an output signal of a resetting signal line, a voltage of an initial voltage end to a driver circuit and a light emitting device to reset the driver circuit and the light emitting device;

outputting, in a second phase of the image frame using a compensation circuit under control of an output signal of a compensation signal line, a voltage of a reference voltage end to a storage capacitor of the driver circuit to perform threshold voltage compensation on the driver circuit by controlling a charging time of the storage capacitor, wherein the charging time of the storage capacitor is controlled by adjusting a pulse width of the output signal of the compensation signal line based on a pulse width of an output signal of a scanning signal line;

writing, in a third phase of the image frame to the driver circuit using a writing circuit under control of the output signal of the scanning signal line, a data voltage output by a data line;

providing, in a fourth phase of the image frame using a light emission enabling circuit under control of an output signal of an enabling signal line, a voltage of a first supply voltage end to the driver circuit; and providing, in the fourth phase of the image frame using the driver circuit under action of the voltage output by the first supply voltage end, a drive current to the light emitting device to emit light based on the drive current.

10. The method of claim 9, wherein the driver circuit comprises a driving transistor, wherein the storage capacitor and the compensation circuit comprise a first transistor, and wherein in the second phase of the image frame, the method further comprises:

turning on the first transistor under control of the output signal of the compensation signal line;

outputting the voltage of the reference voltage end to a gate of the driving transistor using the first transistor;

turning on the driving transistor; and storing, using the storage capacitor, a threshold voltage of the driving transistor.

11. The method of claim 9, wherein the pulse width of the output signal of the compensation signal line is greater than the pulse width of the output signal of the scanning signal line.

12. The pixel circuit of claim 1, wherein the light emitting device is an organic light emitting diode.

13. The display apparatus of claim 8, wherein the driver circuit further comprises a driving transistor, wherein a gate of the driving transistor is electrically coupled to the compensation circuit and the writing circuit, wherein a first electrode of the driving transistor is electrically coupled to the light emission enabling circuit, wherein a second electrode of the driving transistor is electrically coupled to the resetting circuit and the light emitting device, wherein a first end of the storage capacitor is electrically coupled to the second electrode of the driving transistor, and wherein a second end of the storage capacitor is electrically coupled to the gate of the driving transistor.

14. The display apparatus of claim 13, wherein the compensation circuit comprises a first transistor, wherein a gate of the first transistor is electrically coupled to the compensation signal line, wherein a first electrode of the first transistor is electrically coupled to the reference voltage end, and wherein a second electrode of the first transistor is electrically coupled to the gate of the driving transistor.

15. The display apparatus of claim 13, wherein the resetting circuit comprises a second transistor, wherein a gate of the second transistor is electrically coupled to the resetting signal line, wherein a first electrode of the second transistor is electrically coupled to the initial voltage end, and wherein a second electrode of the second transistor is electrically coupled to the first end of the storage capacitor.

16. The display apparatus of claim 13, wherein the writing circuit comprises a third transistor, wherein a gate of the third transistor is electrically coupled to the scanning signal line, wherein a first electrode of the third transistor is electrically coupled to the data line, and wherein a second electrode of the third transistor is electrically coupled to the gate of the driving transistor.

17. The display apparatus of claim 13, wherein the light emission enabling circuit comprises a fourth transistor, wherein a gate of the fourth transistor is electrically coupled to the enabling signal line, wherein a first electrode of the fourth transistor is electrically coupled to the first supply voltage end, and wherein a second electrode of the fourth transistor is electrically coupled to the first electrode of the driving transistor.

18. The display apparatus of claim 8, wherein the light emitting device is a light emitting diode.

19. The display apparatus of claim 8, wherein the light emitting device is an organic light emitting diode.

20. The display apparatus of claim 8, wherein the display apparatus comprises an organic light emitting diode display, wherein the organic light emitting diode display comprises a plurality of light emitting devices and driver circuits, and wherein each of the plurality of light emitting devices comprises an organic light emitting diode.

* * * * *